(12) United States Patent
Baic (10) Patent No.: US 8,641,103 B2
(45) Date of Patent: Feb. 4, 2014

(54) LATCHING MECHANISM

(75) Inventor: Zeljko Baic, Sylmar, CA (US)

(73) Assignee: Avibank Manufacturing, Inc., North Hollywood, CA (US)

(*) Notice: Subject to any disclaimer, the term of this patent is extended or adjusted under 35 U.S.C. 154(b) by 412 days.

(21) Appl. No.: 13/007,491

(22) Filed: Jan. 14, 2011

(65) Prior Publication Data

US 2012/0181797 A1    Jul. 19, 2012

(51) Int. Cl.
*E05C 5/00* (2006.01)

(52) U.S. Cl.
USPC ............ 292/111; 292/110; 292/109; 292/115

(58) Field of Classification Search
USPC .................................................. 292/109–115
See application file for complete search history.

(56) References Cited

U.S. PATENT DOCUMENTS

| | | | |
|---|---|---|---|
| 4,828,299 A * | 5/1989 | Poe ............................... | 292/139 |
| 5,620,212 A * | 4/1997 | Bourne et al. ................ | 292/113 |
| 6,343,815 B1 * | 2/2002 | Poe ............................... | 292/113 |
| 7,066,501 B2 * | 6/2006 | Meineke et al. .............. | 292/110 |

* cited by examiner

*Primary Examiner* — Carlos Lugo
*Assistant Examiner* — Mark Williams
(74) *Attorney, Agent, or Firm* — James M. Duncan, Esq.; Klein DeNatale Goldner (57) ABSTRACT

An aircraft latch utilizes a spindle in combination with an over-center linkage assembly to impart linear motion to a hook member, causing the hook member to either disengage or engage a keeper member on the adjacent structure. The over-center linkage and the spindle are operated by different and independent operations of a handle member. Specifically, the over-center linkage is moved from a stored position, in which the two link members are in end-to-end axial alignment, to a position in which the two link members are no longer in end-to-end axial alignment. This movement is caused by pivoting the handle member from a position in which the longitudinal axis of the handle member is parallel to the axis of the aligned link members, to a second position in which the handle member is pivoted at least ninety degrees. This pivoting motion, which may be accompanied by other actions, such as releasing a trigger, causes the two link members to pivot with respect to each other, or "break". Once the two link member have broken from the over-center position, the handle is then rotated, causing the spindle to rotate, and thereby imparting a generally linear motion to the hook member, causing the hook to disconnect from the keeper member. The hook member is caused to engage the keeper member by reversing these steps.

11 Claims, 14 Drawing Sheets

LATCHING MECHANISM

BACKGROUND OF THE INVENTION

The invention relates to latches; and more particularly, to aircraft latches. Latches are used on the exterior surfaces of aircraft where it is important that the latch present a flush surface with the aircraft body and indicate when the latch is in a locked or unlocked position. Such latches normally cooperate with a keeper or locking pin on an opposing surface for engaging the latch. It is important that such latches be securely and tightly latched especially when subjected to high vibrations and rattling. This is particularly true when the latch must draw together larger structures over longer distances, and the latch is subjected to higher loads.

SUMMARY OF THE INVENTION

It is an object of this invention to provide an aircraft latch which has the capability of drawing together larger structures over relatively long distances, securely closing and locking so the aircraft latch cannot be opened accidentally during service or the like and which meets requirements for high loading, spatial limitations and meets kinematic requirements. These objects are met by combining an over-center link mechanism with a worm-gear drive mechanism. The apparatus comprises a handle member which both opens the latch but which also drives a gearing system to complete the latch opening process to achieve the large take-up requirements. The presently disclosed device draws larger structures together over longer distances, preloads the system to higher loads, and carries higher loads.

An embodiment of the apparatus utilizes a spindle utilized in connection with over-center linkage to impart linear motion to a hook member, which cause the hook member to either disengage or engage a keeper member on the adjacent structure. The over-center linkage and the spindle are operated by different and independent operations of a handle member. Specifically, the over-center linkage is moved from a closed position, in which the two link members are in end-to-end axial alignment, to a position in which the two link members are no longer in end-to-end axial alignment, by pivoting the handle member from a position in which the longitudinal axis of the handle member is parallel to the axis of the aligned link members, to a second position in which the handle member is pivoted at least ninety degrees. This pivoting motion, which may be accompanied by other actions, such as releasing a trigger, causes the two link members to pivot with respect to each other, or "break". Once the two link member have broken from the over-center position, the handle is then rotated, causing the spindle to rotate, and thereby imparting a generally linear motion to the hook member, causing the hook to disconnect from the keeper member.

DETAILED DESCRIPTION OF THE EMBODIMENTS

Figure 1:
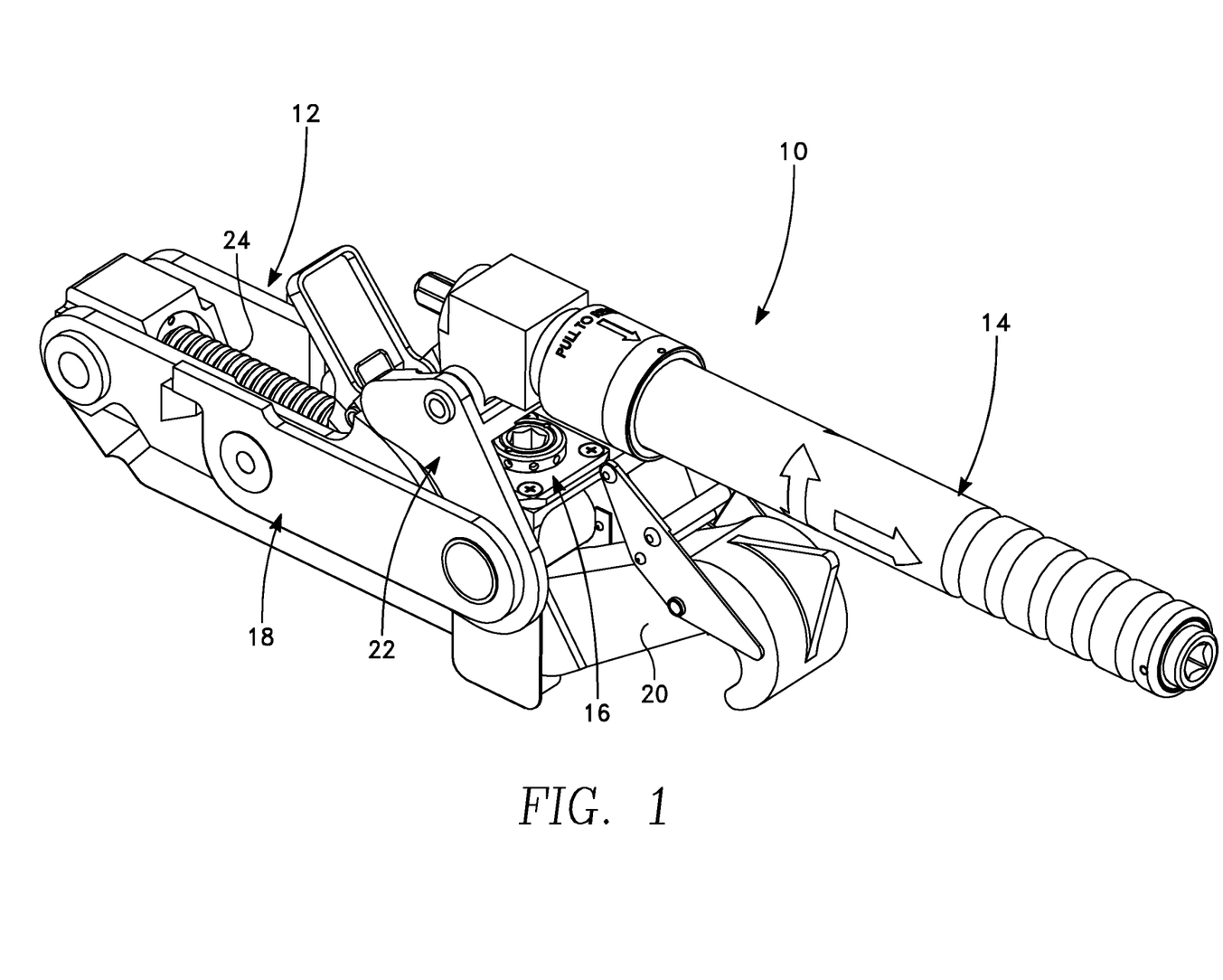
FIG. 1 shows a perspective view of an embodiment of the disclosed latching mechanism.
Figure 3:
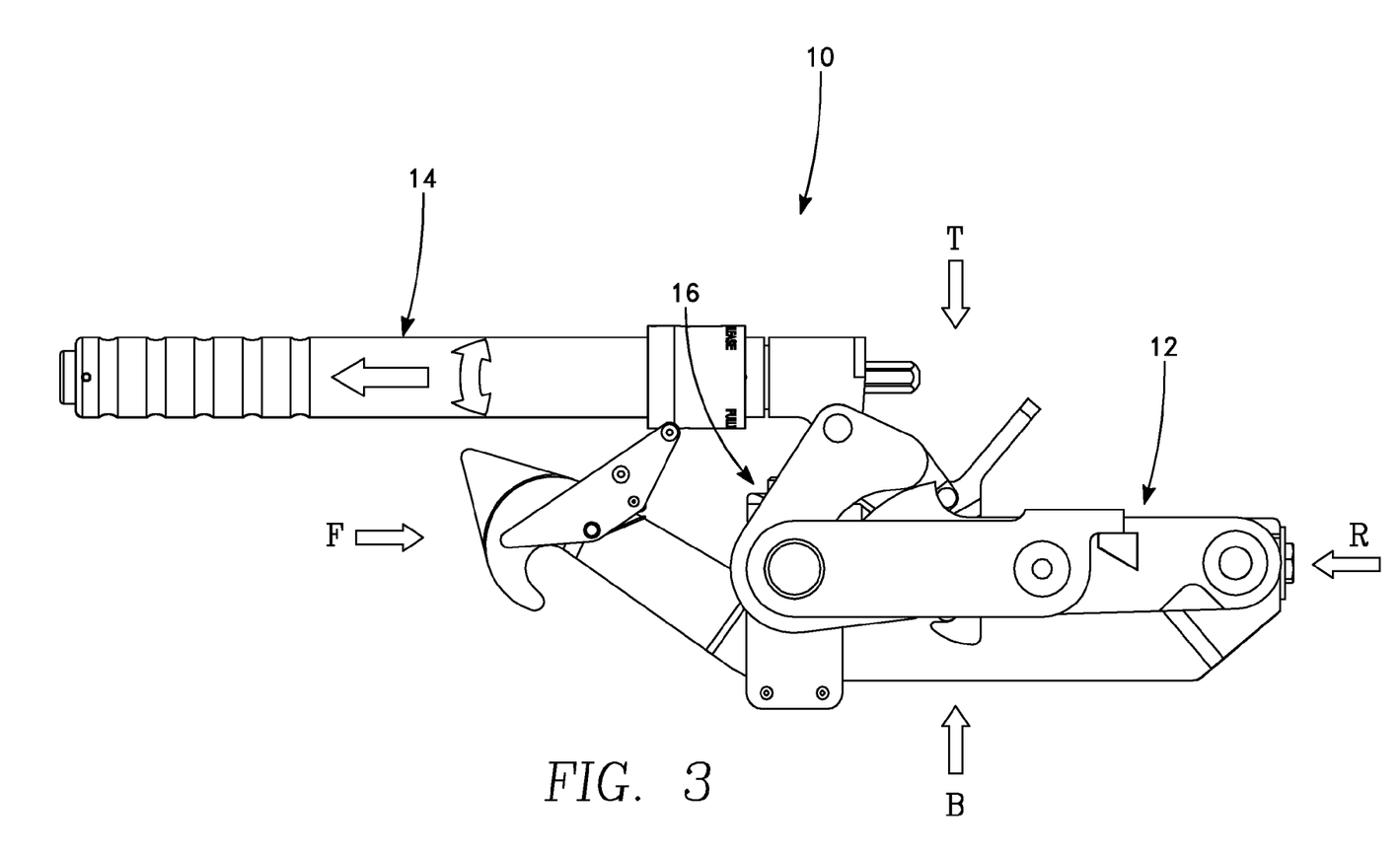
FIG. 3 shows a side view of the embodiment depicted in FIG. 1.

Referring now to the Figures, an embodiment of the disclosed latching mechanism 10 is depicted in FIG. 1. The latching mechanism 10 generally comprises two components, being a latch assembly 12 and a handle member 14. Latch assembly 12 generally comprises a gear housing 16, an over-center link assembly 18, a latch body 20, cam member 22, and a spindle 24. Referring to FIG. 3, in indicating various directions within the following description, the front of the latching mechanism 10 is indicated as F, the rear is indicates as R, the bottom is indicated as B, and the top indicated as T. However, it is to be appreciated that the latching mechanism 10 is operational in any relative position and the above designations are provided for reference purposes only.

Gear housing 16 comprises a pair of intermeshing bevel gears 26, 28 which are generally mounted at right angles to one another. The first bevel gear 26 has means for engagement with the spindle 24, such as a rearward facing opening 30. First bevel gear is mounted within the gear housing 16 in such a manner as to allow the rotation of the gear, such as mounting the gear within a bearing 32. First bevel gear 26 has means for engaging the spindle 24. For example, first bevel gear 26 may have rearward facing opening 30 for engaging the front 34 of spindle 24. Rearward facing opening 30 will be configured in such a manner to provide a positive engagement, such as a hexagonal configuration. Second bevel gear 28 is attached to housing cover 36 and is mounted to rotate within bearing 38. Second bevel gear 28 has an upward facing opening 40 which will, similar to rearward facing opening 30, be configured for positive engagement with a male member. Gear housing 16 further comprises side plates 42. Mounted on pins disposed between side plates 42 are rollers 44.

Figure 5:
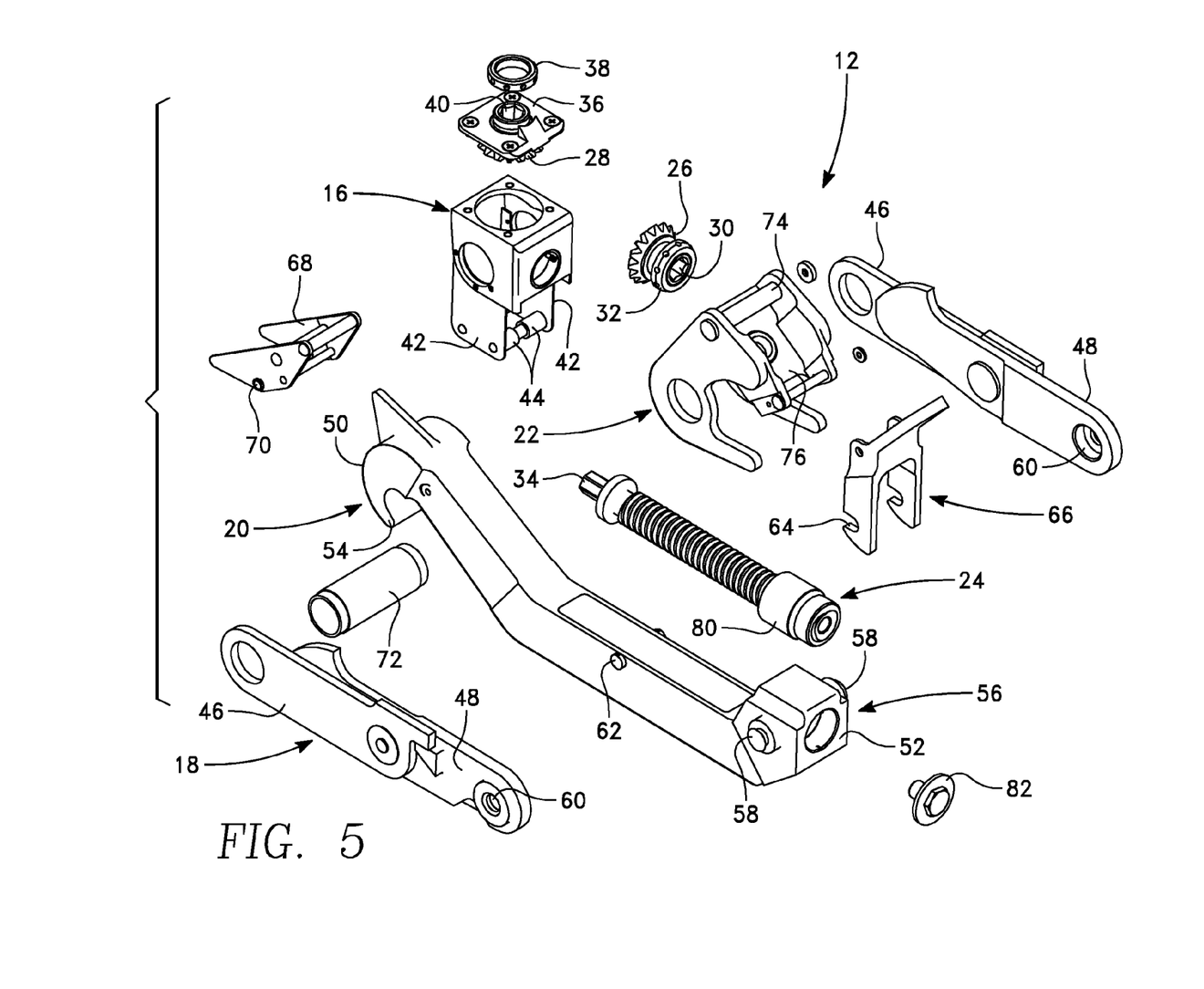
FIG. 5 shows an exploded view of the latch assembly.
Figure 10:
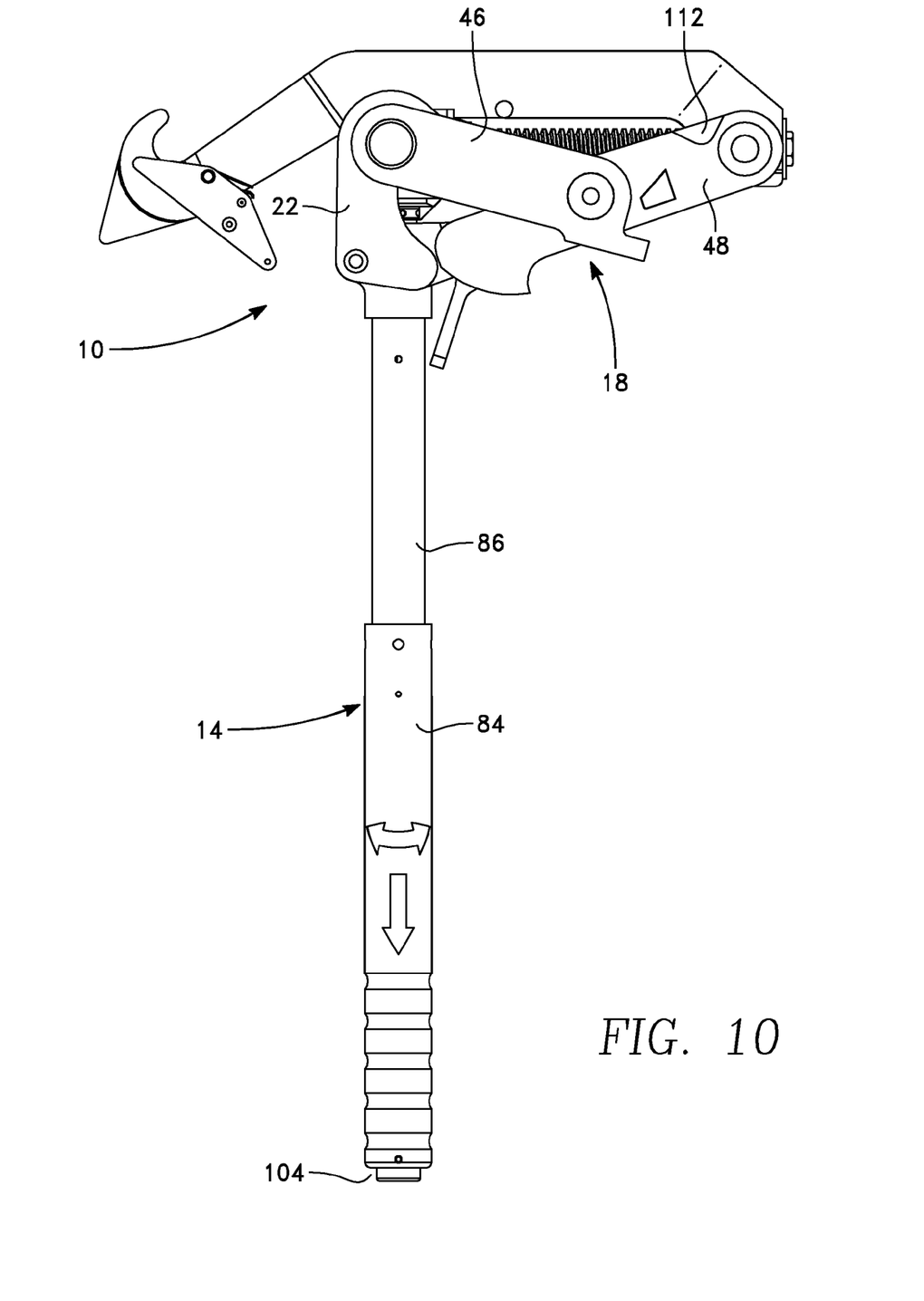

Over-center link assembly 18 comprises two front links 46. Pivotally attached to each front link 46 is a rear link 48 such that the front links and rear links are attached in an end-to-end configuration, and front link-rear link assembly is disposed on either side of latch body 20. The over-center link assembly 18 has a first position in which each front link 46/rear link 48 pair are in axial alignment, as shown in FIG. 5. The over-center link assembly 18 is defined to have a second position which may be any position in which the front link 46 and rear link 48 are not in axial alignment. One example of the second position is shown in FIG. 10. In FIG. 10, the over-center link assembly may said to be "broken", meaning the over-center configuration has been altered.

Figure 2:
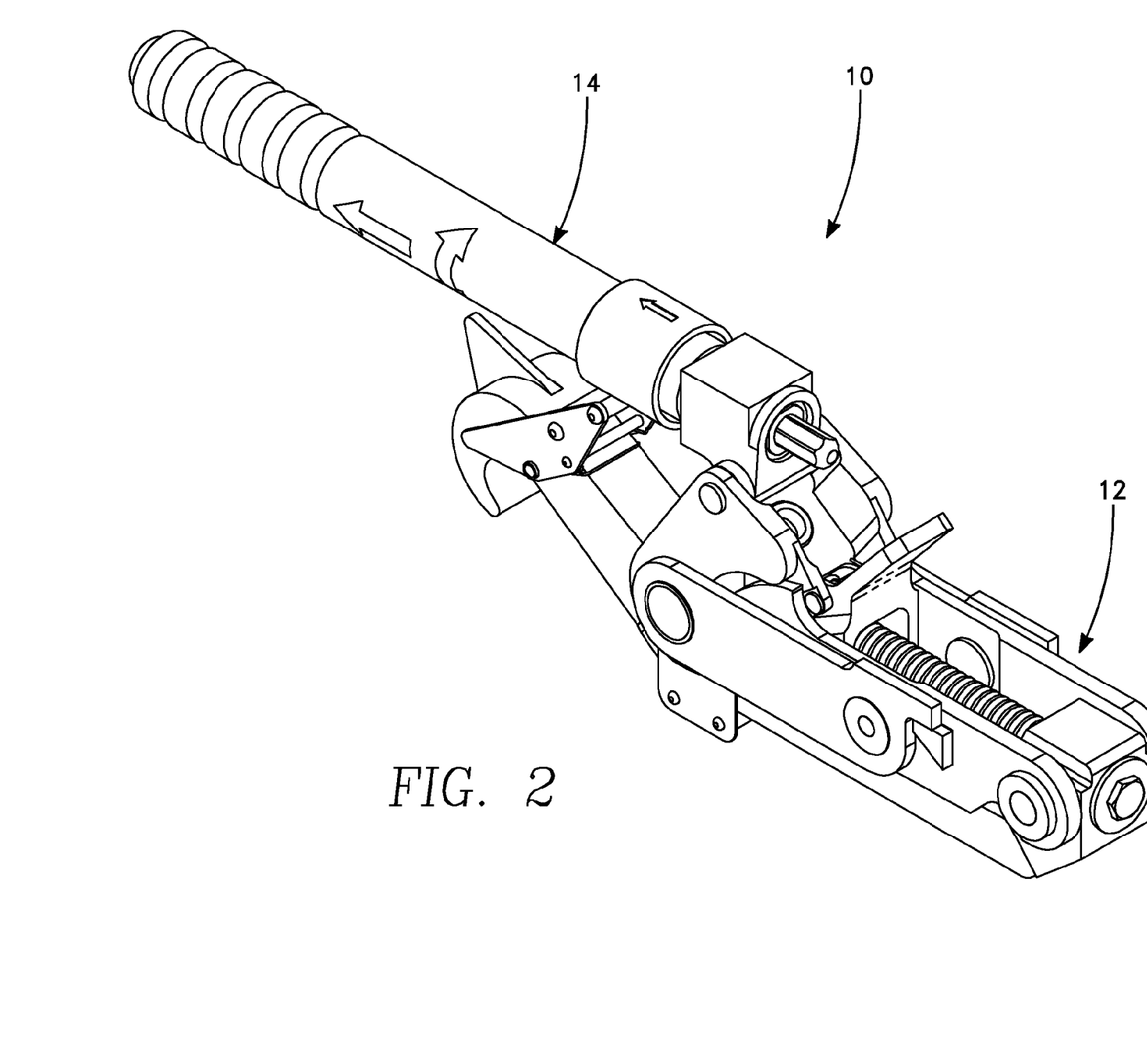
FIG. 2 shows the opposite side of the embodiment depicted in FIG. 1.

As best shown in FIG. 5, the latch body 20 has a front portion 50 and a rear portion 52. The front portion 20 terminates with a hook member 54 which engages a keeper (not shown) of an adjacent structure. The rear portion 52 of the latch body 20 has a spindle attachment member 56, which has internal threads matching the threads of spindle 24. As shown in the figures, the spindle attachment member 56 may be integral to the latch body 20. The rear portion 52 also has means for pivotal attachment of the over-center link assembly 18. As shown in FIG. 5, the means for pivotal attachment may comprise integral pin members 58 which fit into apertures 60 of rear link 48. However, it is to be appreciated that other means for pivotal attachment may be utilized, such as openings in spindle attachment member 56 which receive male members extending from rear link 48. Latch body 20 further comprises integral pins 62 which are engaged by slot 64 in trigger 66. Trigger 66 is biased in the closed position by biasing means, such as a torsion spring (not shown). Safety 68 is mounted at the front of latch body 20 with rivet 70. Safety 68 is biased by a torsion spring (not shown) which rotates safety into the opening of hook member 54 unless handle member 14 is in the downward (closed) position, as shown in FIGS. 1-3.

Cam member 22 is attached by mounting bushing 72 to front links 46 and to gear housing 16. In addition, handle member 14 is pivotally attached to the upper side of cam member 22 with pin 74. Trigger 66 is pivotally attached to the back of cam member 22. Cam member 22 further comprises guide plate 76 which has an opening 78 which, cam member 22 is rotated into the opening position by handle member 14, will provide access to the upward facing opening 40 in second bevel gear 28.

Spindle 24 comprises a threaded shaft. A single start class 3G Acme thread per ASME/BSNI B1.5-1988 is an acceptable thread. Spindle 24 has a rear end 80 which threads through the spindle attachment member 56 of the latch body. Stop pin 82 is attached to the rear end 80. Spindle 24 has a front 34 which is operationally attached to the handle member 14 with a gear means, such that rotation of the handle member causes rotation of the spindle. For example, front 34 may comprise a male extension which is configured to lockingly engage rearward facing opening 30 of first bevel gear 26. Once the over-center link assembly 18 has been "broken" from an axially aligned configuration from rotation of the handle member 14 as described in greater detail below, rotation of the spindle 24 causes the front links 46 and rear links 48 to collapse together as spindle attachment member 56 is pulled forward on the threads of the spindle, such that latch body 20, including hook member 54, is moved forward, thereby unlocking the hook member from the keeper Likewise, rotation of the handle member 14 in the opposite direction moves the hook member 54 of the latch body to move back to the locked position.

Figure 6:
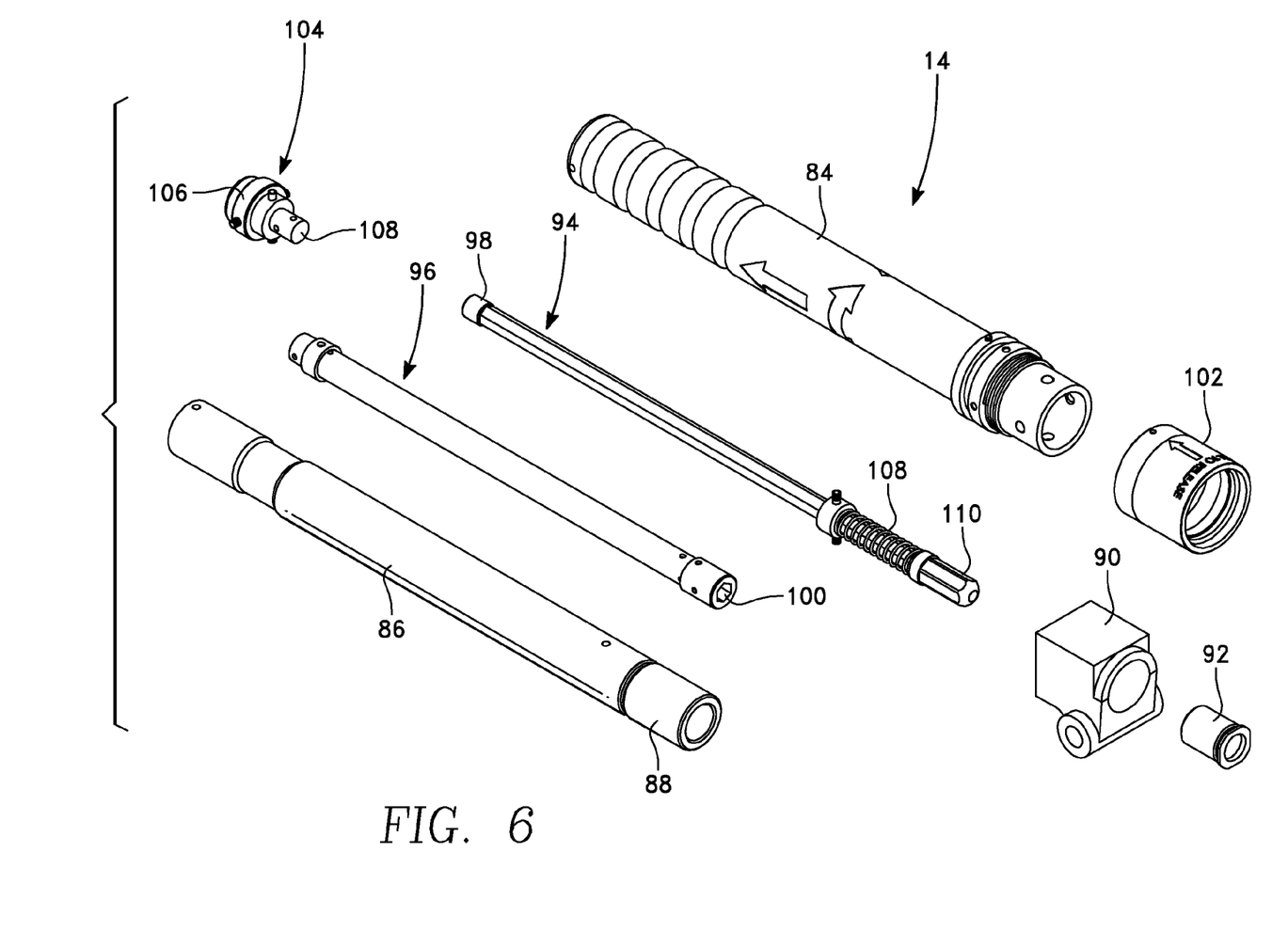
FIG. 6 shows an exploded view of the handle member of an embodiment of the disclosed latching mechanism.

FIG. 6 shows an exploded view of handle member 14. Handle member 14 comprises handle 84 and inner tube 86 which collapses inside of the handle when the handle member 14 is in the locked position as shown in FIGS. 1-3. An end of inner tube 86 is attached to bracket 90 by the insertion of bushing 92 into end 88. Hex rod 94 is partially inserted within rod tube 96, with rod collar 98 stopped and retained within the rod tube by bushing 100, such that portions of the hex rod will slide into and out of the rod tube without the hex rod coming completely out of the rod tube. Bushing 100 has a hexagonal profile which engages hex rod 94 when rod tube 96 is rotated. Handle 84 is attached to collar 102. Collar 102 slides over the end 88 of inner tube 86 and is held in place by lock rings until manually pulled free by an operator, causing handle 84 to telescope outward. When handle 84 is telescoped outwardly, rod tube 96 inside of handle 84 telescopes outwardly as well.

Rod tube 96 is held within handle 84 by connector 104. Connector 104 has an outer ring 106 which abuts the end of handle 84. Connector 104 comprises end 108 which is attached to the end of rod tube 96. End 108 rotates within outer ring 106, allowing rotary motion to be imparted to rod tube 96 by attachment of a tool to the exposed end of connector 104 protruding from handle 84. Rotation of rod tube 96 causes hex rod 94 to rotate as well. Hex rod 94 is biased forward within rod tube 96 by spring 108. Hex rod 94 has a hex end 110. When the handle 14 is unlocked and pivoted into the correct position, hex end 110 engages the upward facing opening 40 of second bevel gear 28. It is to be appreciated that while hexagonal profiles are described for the locking engagement of various components, other locking profiles may be utilized as well without detracting from the functionality of the apparatus.

Figure 7:
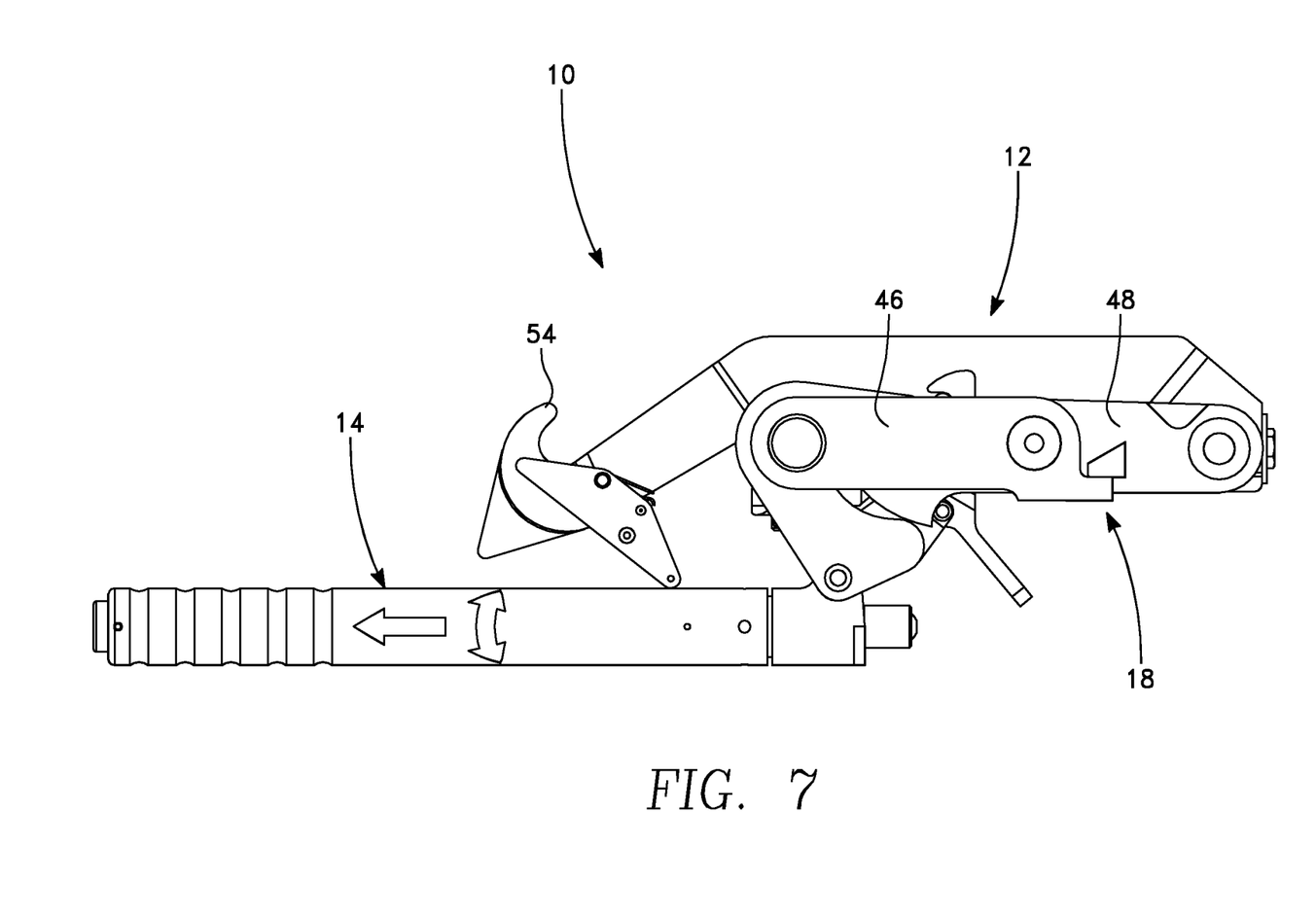
FIGS. 7 through 11 depict the sequence of opening an embodiment of the disclosed latching mechanism, with FIG. 7 showing the latch in the locked position and FIG. 11 showing the latch in the unlocked position.

FIGS. 7 through 11 depict the sequence of opening an embodiment of the disclosed latching mechanism 10. FIG. 7 shows an embodiment of the latching mechanism 10 in the closed position, with the handle member 14 in stored position. As shown in FIG. 7, when the latching mechanism 10 is in the closed position, the front links 46 and the back links 48 of the over-center link assembly 18 are in axial alignment. In this closed position of the latching mechanism 10, the handle member 14 may be said to be in the stored position, i.e., the position in which it will travel. In the stored position, the axis of the handle member 14 is in parallel alignment with the axis of the front link 46 and the back link 48. Handle member 14 is not extended when the latch mechanism 10 is in the closed position.

Figure 8:
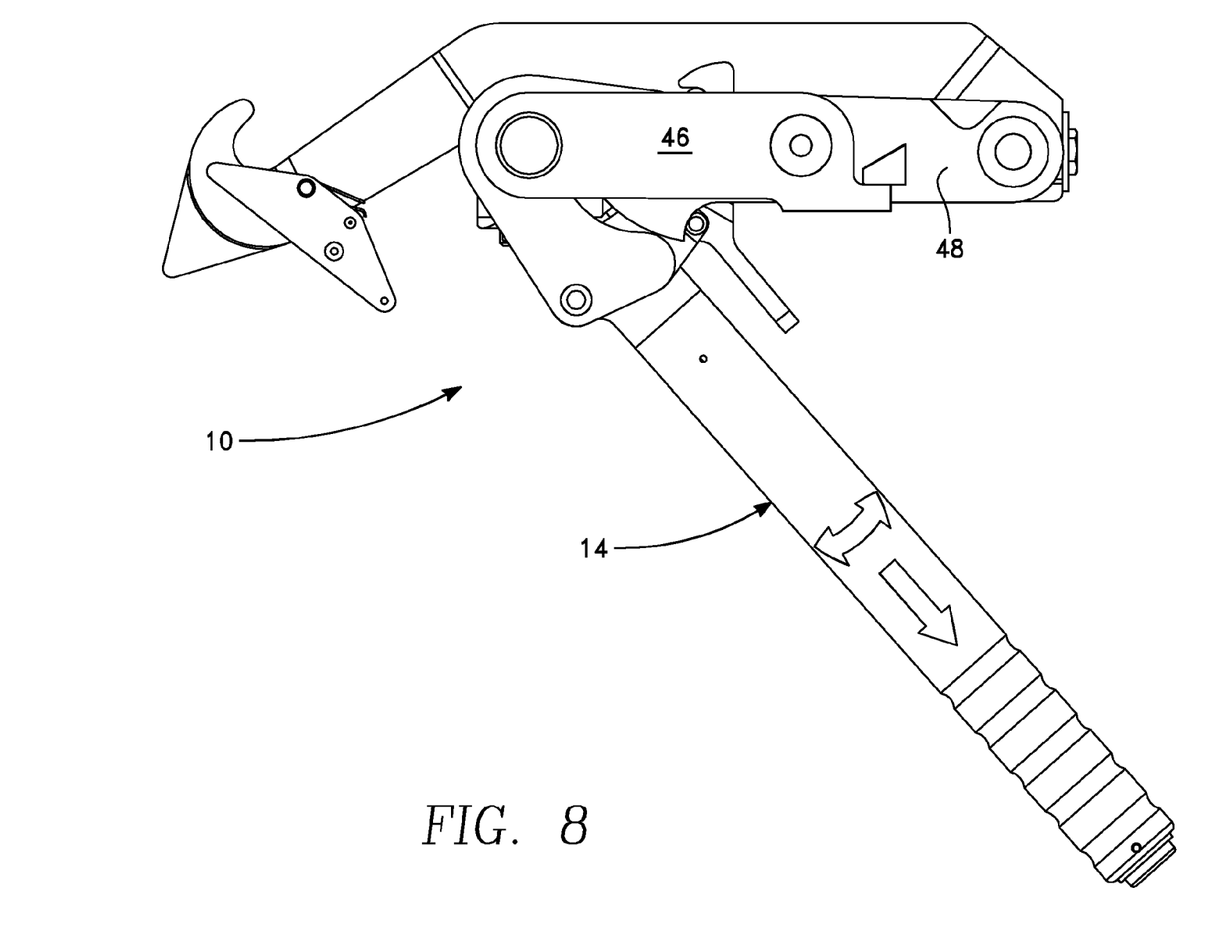
Figure 9:
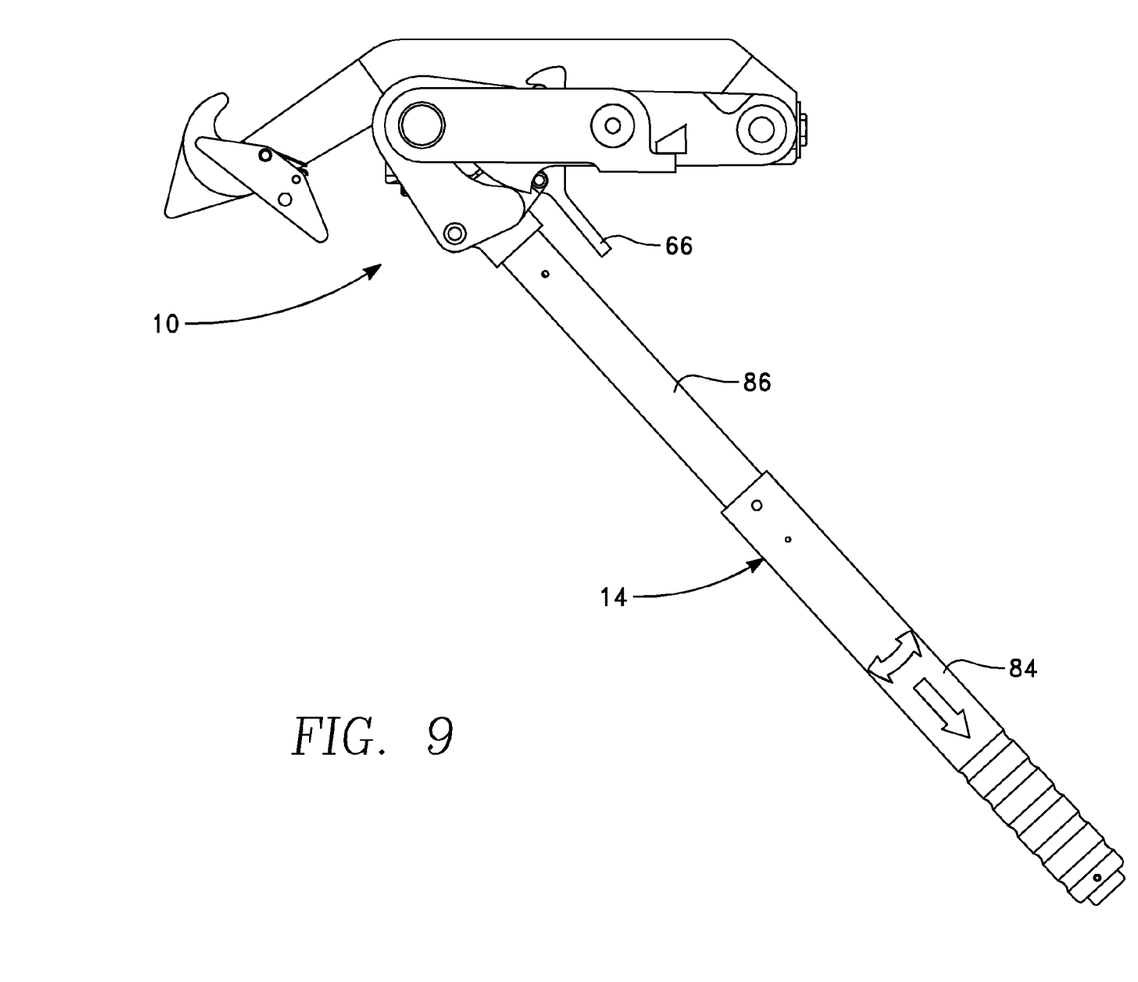

FIG. 8 shows the first step in the opening sequence for this embodiment of the latch mechanism 10. The first step is to pivot handle member 14 greater than 90 degrees from its closed position shown in FIG. 7, such that the handle member 14 is moved from the stored position to an unstored position. The inventor herein has found that a pivot angle of 125 degrees in the handle member 14 is acceptable for the embodiment depicted in FIG. 7. FIG. 9 shows the next step in the opening sequence, in which handle 84 is pulled downward, causing it to telescope from inner tube 86. Once the handle member 14 has been extended, trigger 66 is rotated, causing it to release from integral pins 62.

The next step in the opening sequence is depicted in FIG. 10. Handle member 14 is pivoted toward its stored position, but is stopped at a position which is approximately at 90 degrees from its stored position. As shown in FIG. 10, this action causes the cam member 22 to rotate, breaking the axial alignment of front link 46 and rear link 48. Once the over-center link has been broken in this manner, hex end 110 of hex rod 94 aligns with the opening 40 of second bevel gear 28, and is urged into the opening by spring 108 or other biasing means.

Figure 4:
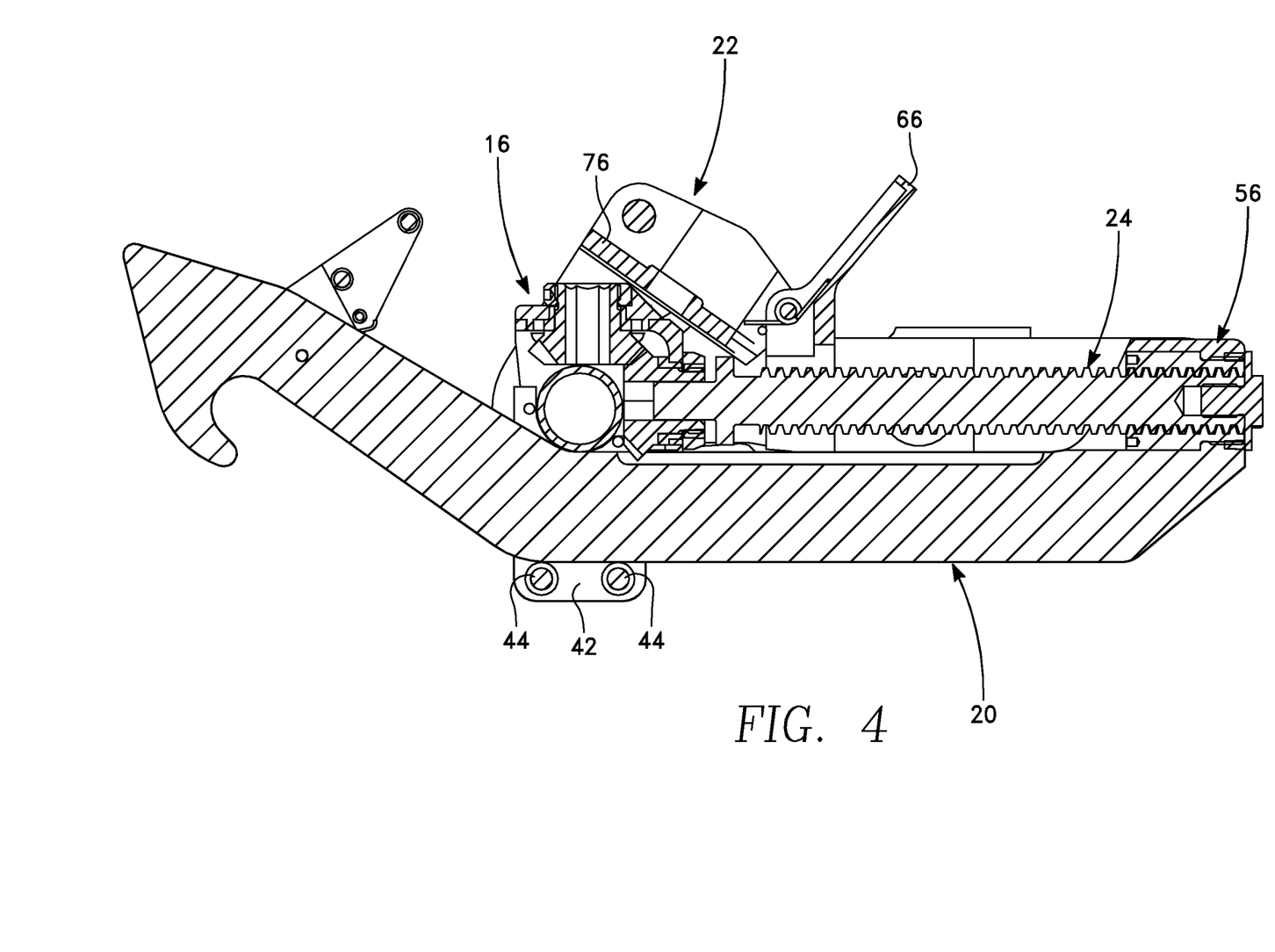
FIG. 4 shows a sectioned view of the latch assembly of an embodiment of the disclosed latching mechanism.
Figure 11:
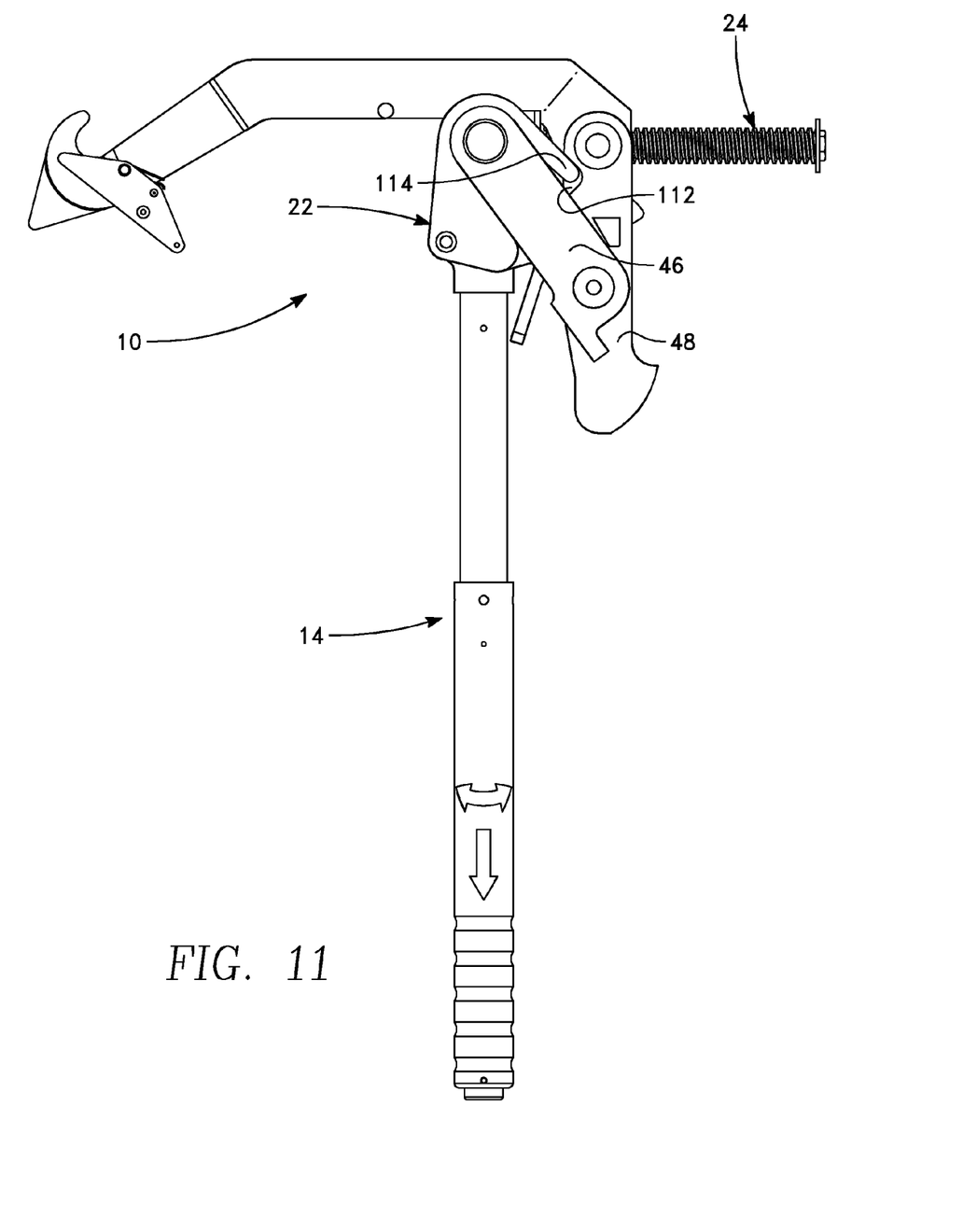

Once hex end 110 has seated in opening 40, a tool is attached to the exposed end of connector 104 protruding from handle 84, and rotary motion, usually clockwise, applied to the exposed end of the connector. The rotary motion causes the rotation of rod tube 96 and hex rod 94 and causing the rotation of second bevel gear 28. Second bevel gear 28 causes the rotation of first bevel gear 26, which in turn causes the rotation of spindle 24. Rotation of the spindle 24 pulls the latch body 20 forward on the threads of the spindle, until the latch body 20 is fully forward. As best shown in FIG. 4, latch body 20 may extend through the lower portion of gear housing 16, between side plates 42, and supported on rollers 44. As shown in FIG. 11, an embodiment of the latch mechanism 10 may comprise a shoulder 112 on each rear link 48 which, when the latch body is fully forward, abuts extensions 114 on cam member 22, thereby imposing a positive indication that the latch body 20 is fully forward.

Figure 12:
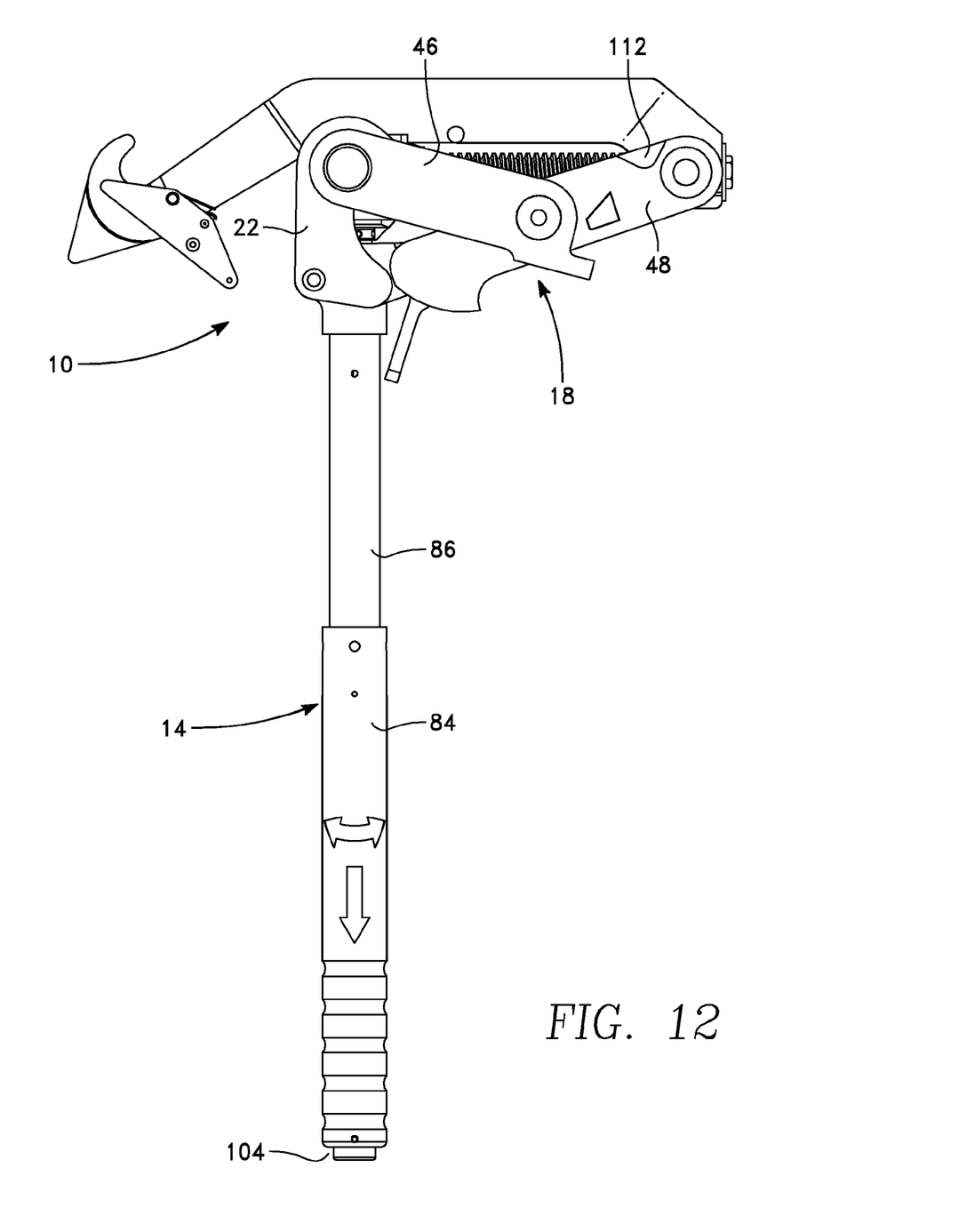
FIGS. 12 through 14 show the sequence of closing an embodiment of the disclosed latching mechanism.

To close the latch mechanism 10, a tool is again attached to the exposed end of connector 104 and rotary motion again applied, in the opposite direction as for opening the latch, so the rotary motion will usually be counter-clockwise. Rotary motion is continued to be applied until the spindle attachment member 56 reaches the end of the threads of spindle 24 at stop pin 82, at which point the latch mechanism 10 is in the configuration depicted in FIG. 12. At this point, handle member 14 is pivoted backward to the position indicated in FIG.

Figure 13:
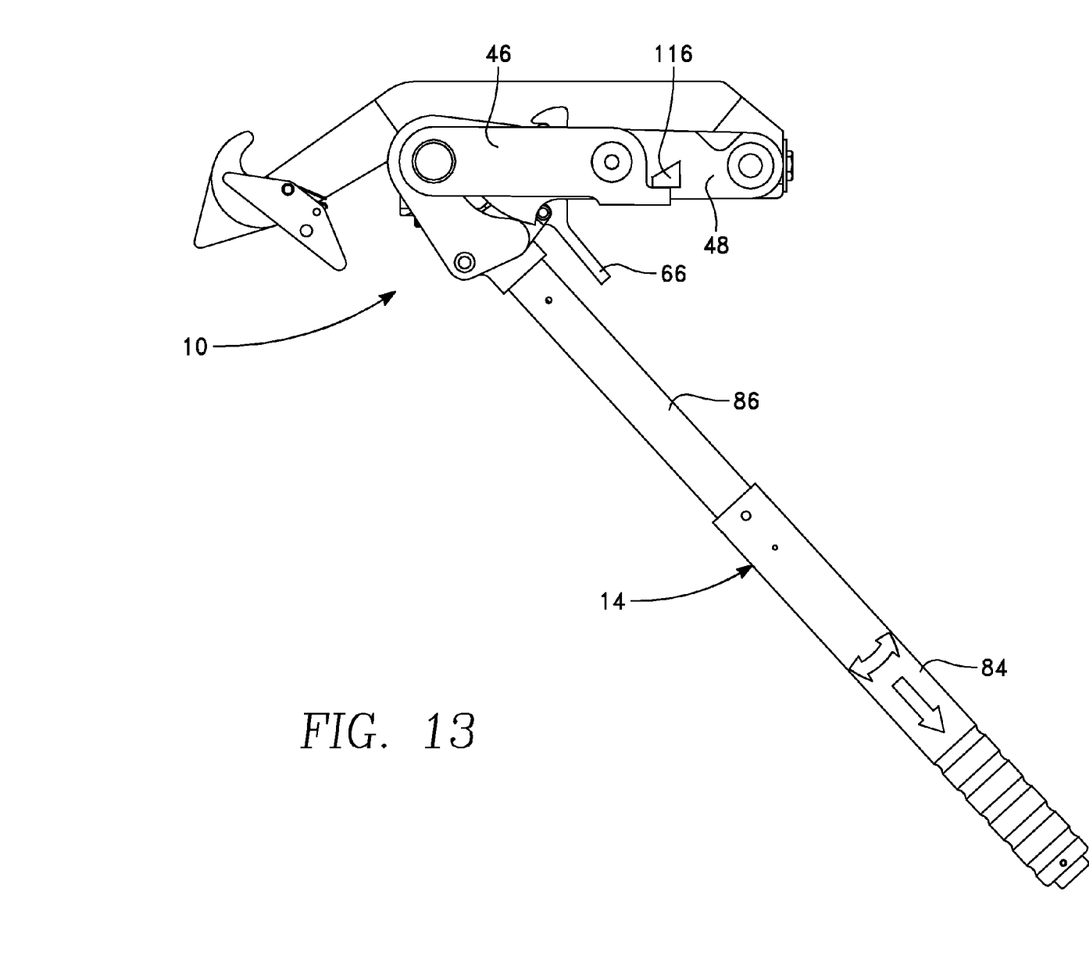
Figure 14:
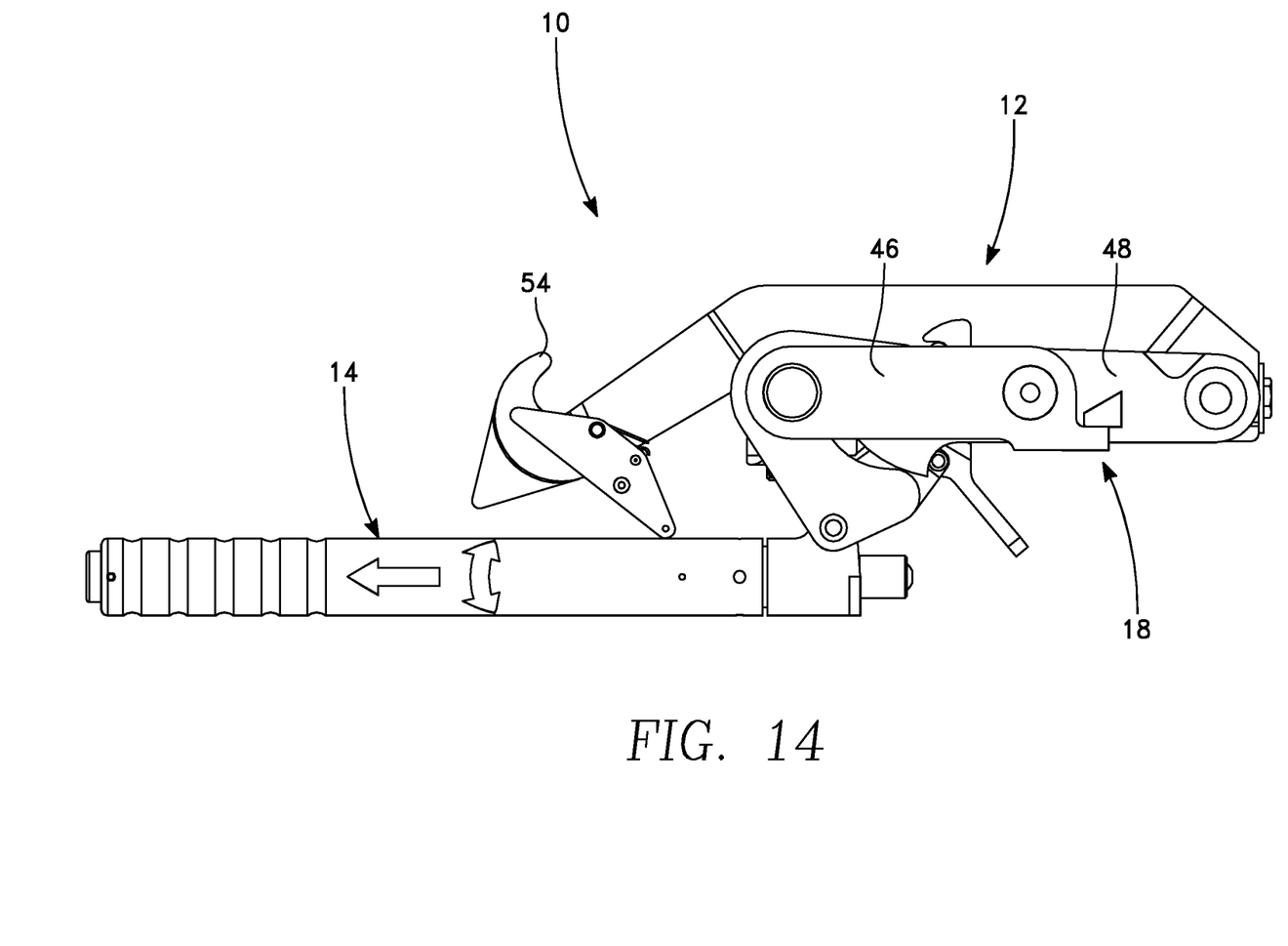

13, thereby pushing front link 46 and rear link 48 back into axial alignment. Rear link 48 may comprise stop member 116 which prevents over rotation of front link 46. Once handle member 14 is pivoted into the position shown in FIG. 13, trigger 66 locks automatically. From the position shown in FIG. 13, the handle 84 is pushed over inner tube 86 and the handle member 14 is pivoted to the stored position shown in FIG. 14, at which point the hook member 54 will have re-engaged the keeper (not shown).

Latch mechanism 10 is fabricated from such materials as accepted within the aircraft industry, including high strength light weight alloy materials, and heat treated as required. The dimensions for each of the components of the latch mechanism 10 will be determined upon load requirements and spatial considerations. Fabricated components are to be inspected according to the appropriate inspection protocol per the applicable aircraft standards.

While the above is a description of various embodiments of the present invention, further modifications may be employed without departing from the spirit and scope of the present invention. Thus the scope of the invention should not be limited according to these factors, but according to the following appended claims.

What is claimed is:

1. A latch mechanism having a hook member selectively moveable from a locked position to an unlocked position and from the unlocked position to the locked position, the latch mechanism comprising:
   an over-center link mechanism having a front member and a back member, the over-center link mechanism having a first position wherein the front member and back member are in axial alignment and a second position wherein the front member and back member are not in axial alignment
   a latch body comprising a front portion comprising the hook member and a rear portion pivotally attached to the back member of the over-center link mechanism, the rear portion comprising internal threads;
   a cam member pivotally attached to the front member of the over-center link mechanism;
   a handle member pivotally attached to the cam member, the handle member having a stored position wherein the axis of the handle member is parallel to the axis of the over-center link mechanism in the first position, and an unstored position ninety degrees or greater from the stored position, wherein the pivoting of the handle member from the stored position to the unstored position moves the over-center link mechanism from the first position to the second position; and
   a spindle member having a rear end comprising threads engaging the threads of the rear portion of the latch body and, the spindle member further comprising a front end attached operationally engaging the handle member via a gear means, such that rotation of the handle member causes rotation of the spindle member via the gear means, moving the hook member from the locked position to the unlocked position and the unlocked position to the locked position.

2. The latch mechanism of claim 1 wherein the gear means comprises a first bevel gear attached to the spindle member and a second bevel gear attached to the handle member.

3. The latch mechanism of claim 1 wherein the handle member comprises a handle in telescoping arrangement with an inner tube.

4. The latch mechanism of claim 3 wherein the handle member further comprises a hex rod in telescoping arrangement with a rod tube.

5. The latch mechanism of claim 4 wherein the handle member comprises a connector having a first end extending outside of the handle and a second end which is attached to the rod tube, and the first end of the connector extending outside of the handle may be rotated without causing the handle to rotate, wherein said rotation causes the rod tube and hex rod to rotate.

6. The latch mechanism of claim 1 further comprising a trigger which maintains the front member and back member of the over-center link mechanism in axial alignment until the trigger is manually released.

7. A latch mechanism having a hook member selectively movable from a locked position to an unlocked position and from the unlocked position to the locked position, the latch mechanism comprising:
   an over-center link mechanism comprising a front link having a first end and a second end, a back link comprising a forward end and a rear end, the forward end of the back link pivotally attached to the second end of the front link;
   a latch member comprising a front portion and a rear portion, the front portion comprising the hook member and the rear portion comprising a spindle attachment member having internal threads and pivot attachment means, the pivot attachment means pivotally attached to the back link;
   a gear housing comprising a first bevel gear and a second bevel gear, the first bevel gear meshing with the second bevel gear;
   a spindle comprising external threads engaging the internal threads of the spindle attachment member, the spindle further comprising a first end attached to the first bevel gear;
   a cam member pivotally attached to the first end of the front link, and the gear housing;
   a handle member operationally engaging the second bevel gear in which, rotation of the handle member causes the spindle to rotate via the gear, causing the hook member to move from the locked position to the unlocked position and from the unlocked position to the locked position.

8. The latch mechanism of claim 7 wherein the handle member comprises a handle in telescoping arrangement with an inner tube.

9. The latch mechanism of claim 8 wherein the handle member further comprises a hex rod in telescoping arrangement with a rod tube.

10. The latch mechanism of claim 9 wherein the handle member comprises a connector having a first end extending outside of the handle and a second end which is attached to the rod tube, and the first end of the connector extending outside of the handle may be rotated without causing the handle to rotate, wherein said rotation causes the rod tube and hex rod to rotate.

11. The latch mechanism of claim 7 further comprising a trigger which maintains the front member and back member of the over-center link mechanism in axial alignment until the trigger is manually released.

* * * * *